Aug. 24, 1954 L. O. GEIPEL 2,686,975
INSIDE AND OUTSIDE CALIPERING APPARATUS
Filed Sept. 22, 1950 2 Sheets-Sheet 1
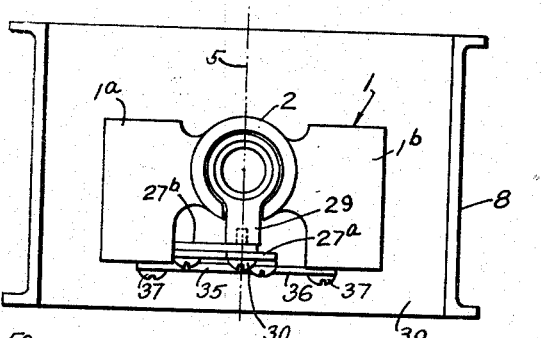
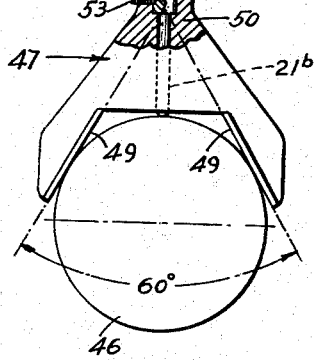
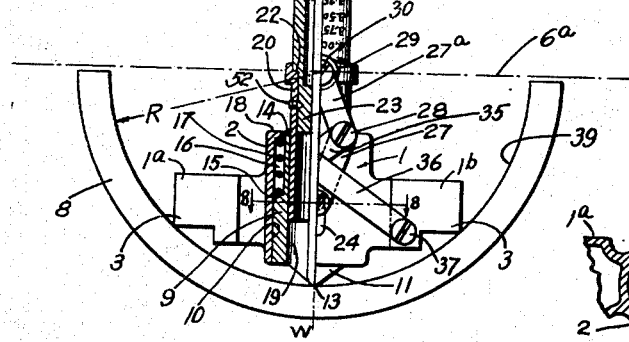
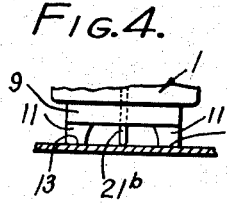
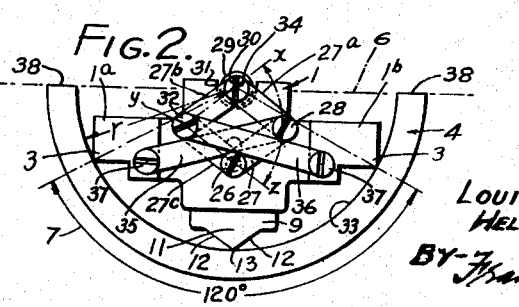
INVENTOR
LOUIS O. GEIPEL, Dec'd
HELEN A. GEIPEL
Adm'x.
BY Francis D. Cannon
ATTORNEY.

Aug. 24, 1954     L. O. GEIPEL     2,686,975
INSIDE AND OUTSIDE CALIPERING APPARATUS
Filed Sept. 22, 1950     2 Sheets-Sheet 2

INVENTOR
LOUIS O. GEIPEL
HELEN A. GEIPEL Dec'd.
BY
ATTORNEY.

Patented Aug. 24, 1954

2,686,975

UNITED STATES PATENT OFFICE 2,686,975

INSIDE AND OUTSIDE CALIPERING APPARATUS

Louis O. Geipel, Culver City, Calif.; Helen A. Geipel, administratrix of Louis O. Geipel, deceased Application September 22, 1950, Serial No. 186,240

5 Claims. (Cl. 33—178)

This invention relates to means for ascertaining the diameter of a bearing when less than 180 degrees of its concave surface is accessible, and also that of the concave surface of a worn bearing cap covering less than 180 degrees of circumference that has been operating as the "top-side" bearing member on the upper face of the journal.

The invention is particularly applicable where it is not necessary to remove the shaft from its bearings, but to merely remove the bearing caps. However, after such a bearing cap has been removed, it is not possible to measure the diameter of the journal with ordinary outside calipers because the bottom member of the bearing prevents their application over a diametric line through the axis of the journal. And the concave surface presents a similar difficulty because the cap does not extend through 180 degrees.

One of the objects of this invention is to provide calipering apparatus that will enable the diameter of the bearing to be established by means of a micrometer with sufficient accuracy for practical purposes.

While the accomplishment of my object results in the provision of means for measuring the diameter and radius of a concave surface where the same does not present 180 degrees of curved surface, it is a fact that on account of the difficulties encountered, the range of the applicator for this purpose is limited to a certain extent.

Further incidental objects of the invention will be evident from the disclosures in the specification.

The invention consists in the novel parts and combinations of parts to be described hereinafter, all of which contribute to produce an efficient inside calipering apparatus.

A preferred embodiment of the invention is described in the following specification, while the broad scope of the invention is pointed out in the appended claims.

In the drawing:

Fig. 1 is a partial elevation and longitudinal section through the applicator and the micrometer carried by it, and also showing a bearing cap in an inverted position supporting the applicator in the position it would have when in use to measure the diameter and radius of the concave cylindrical surface of the body or shell that constitutes the bearing cap.

Fig. 2 is a view similar to Fig. 1 but showing the same applicator alone resting in a concave cylindrical shell of smaller diameter.

Fig. 3 is a plan view of the applicator and shell illustrated in Fig. 1.

Fig. 4 is a fragmentary view and is a diagrammatic sectional view to show the outline of contact edges or tips of the contact slide of the applicator.

Fig. 5 is a section through a shaft and a portion of its bearing, and illustrating my shaft applicator in the position it would have when being applied to the exposed zone or arc of a journal when measuring its diameter or radius.

Fig. 8 is a fragmentary view and is a horizontal section on line 8—8 of Fig. 1.

Figure 7:
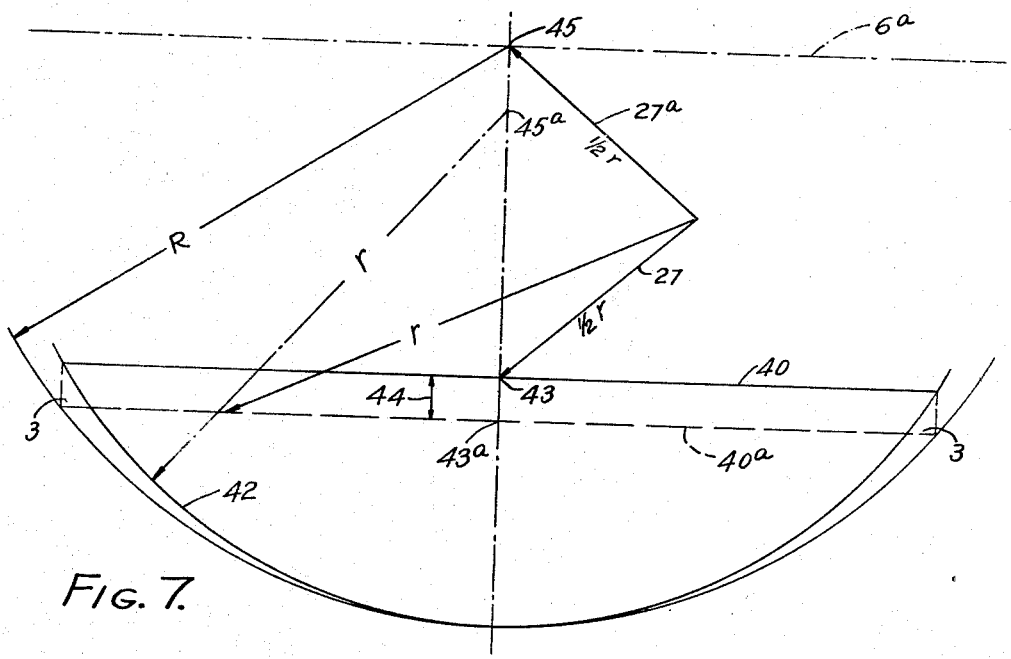
Figs. 6 and 7 are two diagrammatic figures demonstrating the mode of operation and accuracy of some apparatus that may be used with my invention, and that functions to measure the diameter and radius of a shaft journal.

Before proceeding to a more detailed description of the present invention, it should be stated that the present application is a continuation in part of my prior application Serial No. 668,807 filed May 10, 1946, bearing the title Micrometer Caliper; now abandoned.

Referring now to the parts illustrated in the drawing and particularly to Figs. 1 and 2, the "inside" applicator there illustrated has a frame, body or casing 1 of block form having two sides or wings 1a and 1b that extend laterally and forwardly from a central hub or nave 2.

The wings 1a and 1b are provided with tips 3 which are projecting dihedral angles that extend in a front and rear direction. These angles are seen in front elevation in Fig. 1. In using the instrument it should be applied in a perfect or unworn shell such as the shell 4 so that the vertex lines of these dihedral angles extend longitudinally of the shell and parallel to the axial line 5 of the shell, shown in Fig. 3 as a line viewed from above and as a point 34 in Fig. 2 on the diametrical line 6, of the shell.

The line joining the extremities of the tips 3 is referred to hereinafter as the "chord line" because it constitutes a chord of the arc 7. This subtended angle is 120 degrees, and the parts of the applicator are organized so that when the micrometer is held by its micrometer holder it can be adjusted to measure the diameter of this shell 4. And this applicator 1 can then be employed for measuring the inside diameter of a shell 8 of larger diameter, but within the limits of the range of the instrument. For example, if the shell 4 has an inside diameter of 2.50 inches it can measure correctly the inside diameter of any shell up to 3.25 inches in diameter. In other words, the range of the instrument being described is ¾ of an inch on diameters. That is sufficient to enable the instrument to be used satisfactorily on rebuilding operations involving shaft journals that have diameters reasonably within those limits.

In order to construct the mechanism of the applicator so as to accomplish this, the frame or casing 1 is provided with a slide 9 preferably having a cylindrical body that fits neatly in a guide bore 10 in the nave 2.

This slide has two spaced contact tips or points 11 that are tapered, each tip having two inclined faces 12 that intersect to form a dihedral angle and edge 13. These edges are parallel with the edges of the dihedral angles at the tips 3.

These two contact tips 11 are located at diametrically opposite points of the slide 9 which of course is of tubular form. The upper portion of the slide 9 is a neck 14 of reduced diameter, see Fig. 1, so that a shoulder 15 and an annular chamber 16 are formed to house a coil spring 17. This spring thrusts at its lower end against the shoulder 15, and at its upper end against the shoulder formed at the under side of the inwardly projecting flange 18 on nave 2. In other words, this spring biases the tubular or sleeve form slide in an outward direction transversely to the "chord line" between the tips 3,3.

Within the bore 19 of the slide 9 a tubular holder 20 for a micrometer 21 is provided.

The holder 20 has a shouldered socket 22 at its upper end (see Fig. 1) past which a reduced neck 23 extends in the bore of the tubular holder 20.

The slide 9 is, of course, in its extreme extended position in Fig. 2. Its outward movement is limited by the lower end of a vertical slot 24 (see Figs. 1 and 8) formed through the forward wall of the casing 1.

Mechanism is provided connecting the slide 9 to the holder 20 that operates to control the position of the holder 20 so that a correct reading of the caliper or micrometer can be taken when the instrument is applied to a concave cylindrical surface of revolution.

Referring now particularly to Fig. 2 it should be understood that this view illustrates the instrument set in place in the shell 4, which is of a relatively small inside diameter or radius. In the position of the instrument illustrated the slide is in its extreme extended position, and in that position the holder 20 is in its extreme low position. As illustrated in Fig. 8 the slot 24 is occupied by a bushing 25 around a long pin or screw 26 the inner end of which is threaded into the adjacent side of the slide 9. This pin or screw 26 constitutes the lower point of connection for the mechanism that controls the position of the holder 20 when a reading is being taken. Between the screw 26 and the upper end of the holder 20 a system of links is provided to effect this. This linkage includes a link 27 pivotally attached to the screw 26, which extends upwardly and outwardly inclined at an angle of 30 degrees to a horizontal line, the upper end being attached to a link 27a by a pivot screw 28, which link 27a extends upwardly and inwardly in an inclined direction and is attached pivotally at its upper end to the end of a neck 29 that extends out from the forward side of the holder 20.

This pivot connection is effected by means of a pivot screw 30 that is threaded into the end face of neck 29 (see Fig. 3).

When this instrument is resting as indicated in Fig. 2, the under side of the neck 29 is resting against the bottom of a half round socket 31, and when in this position the link 27a and the link 27 make an angle of 60 degrees with each other. That is to say, the longitudinal axes of these links (that pass thru their pivotal centers) make an angle of 60 degrees with each other. The links 27 and 27a are preferably duplicated at the left side of the instrument, as viewed in Fig. 2, by a link 27b identical to 27a, and a link 27c identical with the link 27. The links 27b and 27c being of the same length as the links 27a and 27 and being connected by a screw 32 similar to the pivot screw 28, their longitudinal center lines $xy$ and $yz$ make an angle $xyz$ of 60 degrees in the Fig. 2 position. All four of the links 27, 27a, 27b, and 27c are of the same length and this length is one half of the radius $r$ which is the radius of curvature of the concave cylindrical face 33 of the shell 4. In this position the center 34 of the screw 30 will coincide with the longitudinal axis of the shell 4 and will lie upon the diametrical line 6 already referred to.

In addition to the two pairs of links already described, I employ two other links 35 and 36, the former of which is pivotally attached to the pivot screw 26 at its upper end, while the other link is attached at its upper end to the pivot screw 32. These two links 35 and 36 are of equal length between the centers of their pivots and cross each other on the vertical axis or axial line that bisects the dihedral angle at 13 and the passes thru the center 34 of the topmost pivot screw 30. The axis of the pivot screw 26 is also on the same vertical axial line or plane.

The lower ends of links 35 and 36 are pivotally attached by pivot screws 37 to the forward faces respectively of the two wings 1a and 1b of the casing 1 (see Fig. 3) on the "chord line" that connects the contact edges of the dihedral angles at the tips 3. Furthermore, it may be said at this point that the axis of the screw 26 in this position of the mechanism is also located on this "chord line."

It should be stated that the shell 4 is an ideal half shell having a given radius $r$ and as it is a complete half shell the radial end faces or lines 38 are located on the diametrical line 6.

Now, when the mechanism illustrated in Fig. 2 is employed to measure the diameter and radius R of a shell 8 having a larger inside diameter the mechanism is applied, of course, to the shell 8 in the same way that it is represented as applied in the shell 4. When this occurs it will be evident that by reason of the larger radius R the contact points or edges at 3 will have to move relatively to the slide 9 to impinge upon the curved surface 39 of the shell 8, and for the same reason, the contact point which is the edge 13 will force the slide 9 relatively upwardly against the resistance of its biasing spring 17. When this occurs the pivot screw 26 will rise in its slot 24 and this upward movement, with the co-action of the links 35 and 36 will cause the links 27a and 27b to assume a less inclined position with relation to a vertical axis or vertical plane passing thru the axial line MW as indicated in Fig. 1. And the axis of the pivot screw 30 will then lie in the horizontal plane in which the diametrical line 6a lies as shown in Fig. 1, which line passes thru the longitudinal axis of the surface of revolution 39.

It is only necessary for the micrometer 21 to give a correct reading indicating the diameter or radius of the smaller shell 4, to have it give a correct reading when indicating the diameter or radius of the larger shell 8. However, I prefer to employ a micrometer the scales of which are graduated to indicate diameter readings instead of radius readings. This makes for correct reading of the scale because the division lines on the scales will then be twice as far apart as they would be if they were indicating radius measures on any given diameter.

Figure 6:
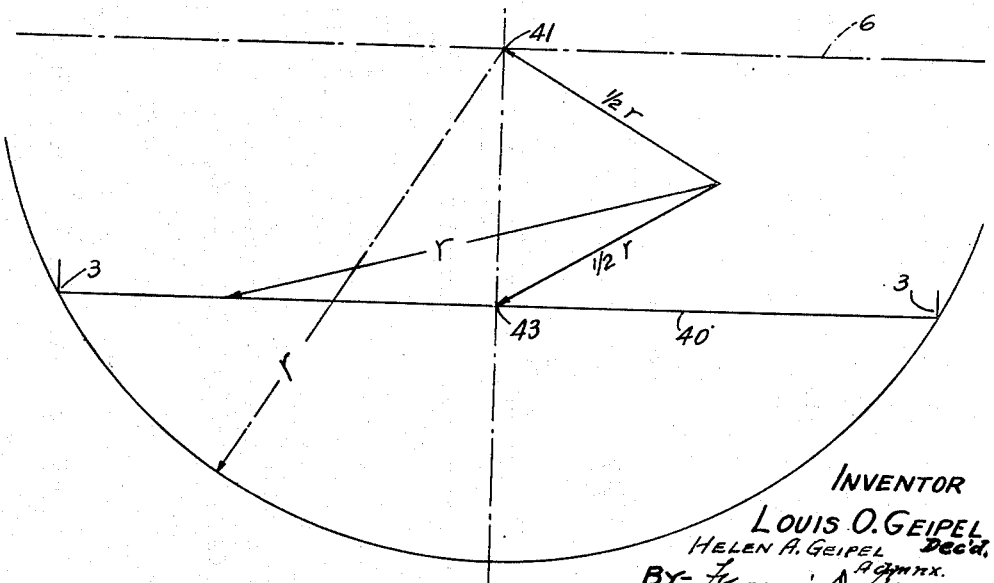

The accuracy of the instrument with the linkage such as described is indicated on the two large scale diagrams shown in Figs. 6 and 7. In Fig. 6, the horizontal line 40 represents the "chord line" that connects the two dihedral edges at 3. In this view the linkage for the right side only is illustrated. In Fig. 6, of course, the center point 41 of the axis line 6 corresponds to the position of the point 34 shown in Fig. 2.

In Fig. 7 the arc 42 is drawn with the radius $r$. As applied to that arc of smaller radius the "chord line" 40 will have the position indicated in Fig. 7 above the line 40a which is the position this "chord line" will take when the instrument is applied to the arc of the greater radius R.

The point 43 on Fig. 7 that corresponds to the axis of the pivot screw 26 will move down the distance indicated by the length of the line 44 to the point 43a. The two links 27 and 27a will have the position of the two radius lines that are indicated as having the length of $\tfrac{1}{2}r$. It will be found that the upper end of the radius line 27a will lie on the center point 45 of the diametrical line 6a. This demonstrates that the axis of the pivot screw 30 will lie upon the diametrical line of the larger shell.

The outside caliper for the shaft journal 46, indicated diagrammatically in Fig. 5 has the same characteristic features of the caliper disclosed in my prior application, referred to above, that is to say, it includes a frame 47 presenting two diverging forks 48 to engage the portion of the circumference of the journal that is exposed to view. These edges or faces 49 make an angle of 60 degrees with each other as indicated on the drawing.

The head 50 that carries the forks of the gauge has a shouldered socket 51 identical with the socket 22 of the inside applicator so that the micrometer 21 employed fits snugly into either of the sockets.

Any suitable means may be provided for holding the micrometer barrel in the socket, for example a flat face on the neck co-operating with a setscrew. Figs. 1 and 5 illustrate the use of a conical socket to receive the conical tip of either of the set-screws, 52 shown in Fig. 1 and 53 shown in Fig. 5.

The axis of the socket 51 and the bore in the head that receives the spindle 21b of the micrometer bisect the sixty degree angle between the edges 49, wherefore when the spindle tip is in contact with the side of a journal the scales will correctly indicate the diameter of the journal.

The micrometer holder 20 supports the micrometer 21 so that the tip of its spindle 21b is approximately at the level of the contact edges 11. In Figure 4 this is shown with the tip exactly in line with these edges 11. That is the position of the tip of the spindle when the spindle is set to take the measurement.

The interchangeability of the micrometer between the two applicators greatly facilitates the measuring of the diameters of a worn journal, and its worn cap.

As there can be only one circumferential arc that can be passed through three points, it is merely necessary to calibrate the micrometer so that its scale indicates the proper diameter for each level of the tip of the micrometer spindle with reference to the "chord" tips 3.

But, of course, a certain "chord" length will be accurate only within the limits of the construction or proportions of the instrument.

Many other embodiments of the present invention may be resorted to without departing from its spirit.

What I claim and desire to secure by Letters Patent is:

1. In an instrument for measuring the radius of a concave cylindrical surface of revolution, the combination of a frame having a pair of separated dihedral angles with edges spaced from each other by a distance equal to the length of a chord of an arc of 120 degrees on a given concave cylindrical surface of revolution, with said edges of said dihedral angles extending substantially parallel to the axis of revolution of said surface, a contact slide guided on said frame along a line perpendicular to the "chord line" connecting said contact edges, said slide having a contact edge parallel to the first named edges, for engaging the said cylindrical surface, a micrometer holder also guided on said frame to move to and fro along said perpendicular line, means for yieldingly resisting inward movement of said contact slide, said slide operating to move relatively inwardly with respect to said "chord line" when said dihedral contact edges are applied to a concave cylindrical surface of larger radius than that of said given surface; and mechanism connecting said slide to the holder operating to move the said holder away from the said surface of larger diameter, said micrometer holder operating to support the micrometer with the tip of its actuating spindle approximately at the level of the said contact edge of said slide.

2. In an instrument for measuring the radius of a concave cylindrical surface of revolution, the combination of a frame having a pair of separated dihedral edges spaced from each other by a distance equal to the length of a chord of an arc of 120 degrees on a given concave cylindrical surface of revolution with said edges extending substantially parallel to the axis of revolution of said surface, a contact slide guided on said frame along a line perpendicular to the "chord line" connecting said contact edges, said slide having a centrally located contact edge parallel to the first named edges for engaging the said cylindrical surface at an intermediate point on the said surface of revolution, a micrometer holder also guided on said frame to move to and fro along said perpendicular line, means for yieldingly resisting inward movement of said contact slide, said slide operating to move relatively inwardly with respect to said "chord line" when said dihedral contact edges are applied to a concave cylindrical surface of larger radius than that of said given surface; a link having a length substantially equal to half the radius of said cylindrical surface, pivotally attached at one end to the said micrometer holder at a point on the axis of the said given cylindrical surface, a second link pivotally attached at one end to the other end of the first named link, said last named link having a length equal to the radius of said given surface, and pivotally attached at its lower end to said frame at a point substantially in the horizontal plane of said "chord line" and located on the other side of the vertical plane passing through said axis and the contact line of said contact slide; said links co-operating when said contact edges are applied to a concave surface of larger radius than that of said given surface, within the range of the instrument, to move said micrometer holder away from the said "chord line," said micrometer holder operating to support the micrometer with the tip of its actuating spindle approximately at the level of the said contact edge of said slide.

3. An instrument according to claim 2, including means for limiting the movement of said micrometer holder to confine the use of the same substantially to the practical range of the instrument.

4. An instrument of the kind described, according to claim 2, including a third link attached at one end to the said pivotal connection that attaches together the first two links; said third link having a pin connected to it at its other end; said frame having a slot extending at right angles to the direction in which said contact edges extend, and in which said last named pin runs, thereby effecting a sliding connection for connecting the other end of said third link to said frame.

5. An instrument of the kind described, according to claim 4, said contact slide being formed as a sleeve carrying said last named pin, and a coil spring associated with the sleeve, and operating as the means for yieldingly resisting inward movement of said sleeve when its contact edges engage the said surface of revolution.

References Cited in the file of this patent

UNITED STATES PATENTS

| Number | Name | Date |
|---|---|---|
| 181,809 | Williams | Sept. 5, 1876 |
| 979,248 | Ayers | Dec. 20, 1910 |
| 1,020,020 | Brawley | Mar. 12, 1912 |
| 1,151,635 | Webb | Aug. 31, 1915 |
| 1,325,631 | Fields | Dec. 23, 1919 |
| 1,516,769 | Geist | Nov. 25, 1924 |
| 1,617,669 | Coyle | Feb. 15, 1927 |
| 1,656,302 | Swaney | Jan. 17, 1928 |
| 2,572,999 | Elliott | Oct. 30, 1951 |

FOREIGN PATENTS

| Number | Country | Date |
|---|---|---|
| 126,453 | Great Britain | May 8, 1919 |
| 143,615 | Great Britain | May 25, 1920 |
| 295,217 | Italy | Apr. 15, 1932 |